Feb. 26, 1963 G. J. SHARPS 3,078,597
MACHINE FOR TEACHING THE ART OF CASTING
Filed Feb. 9, 1962 5 Sheets-Sheet 3
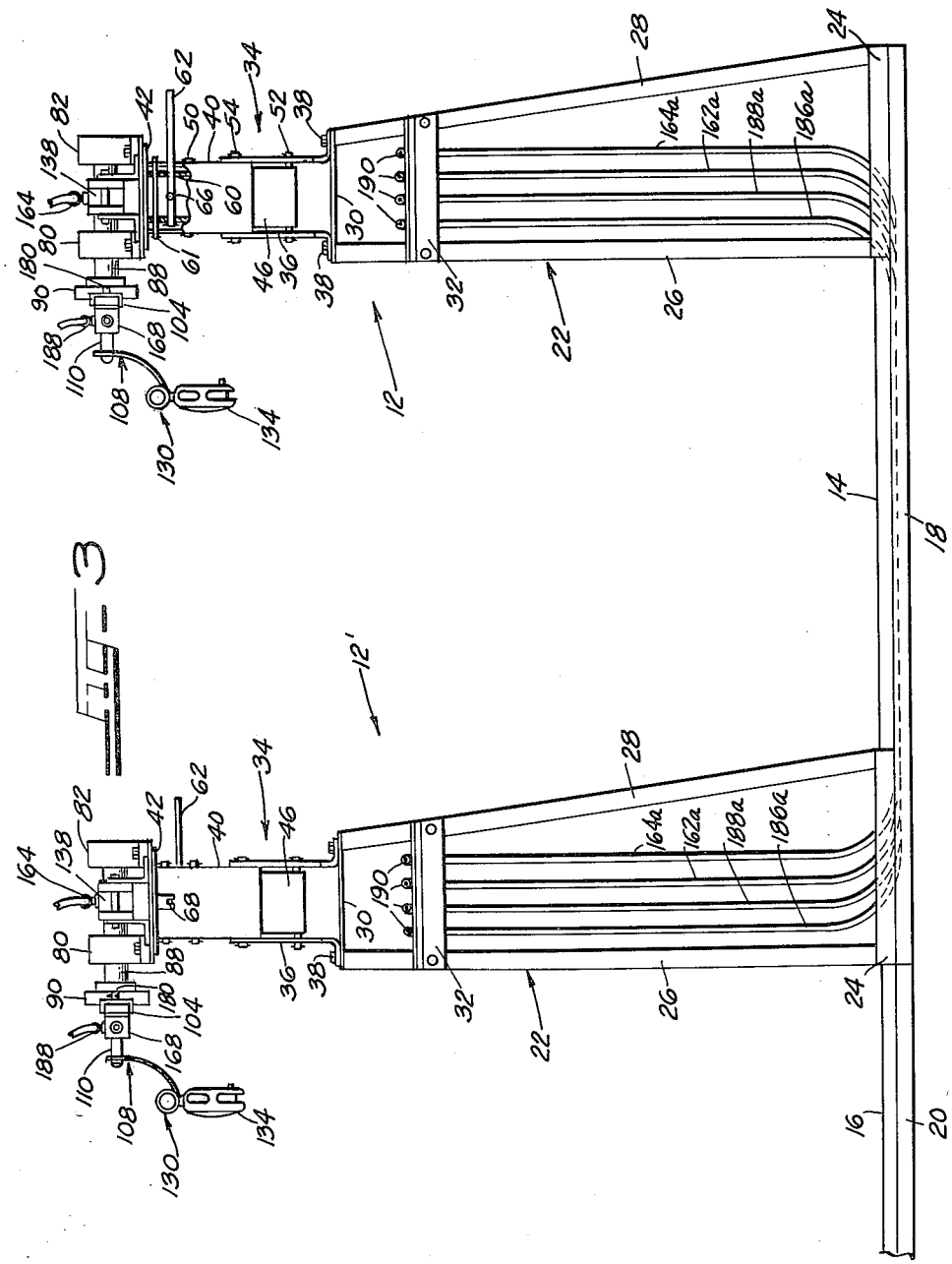
INVENTOR.
GEORGE J. SHARPS
BY Feb. 26, 1963
G. J. SHARPS
3,078,597
MACHINE FOR TEACHING THE ART OF CASTING
Filed Feb. 9, 1962
5 Sheets-Sheet 4
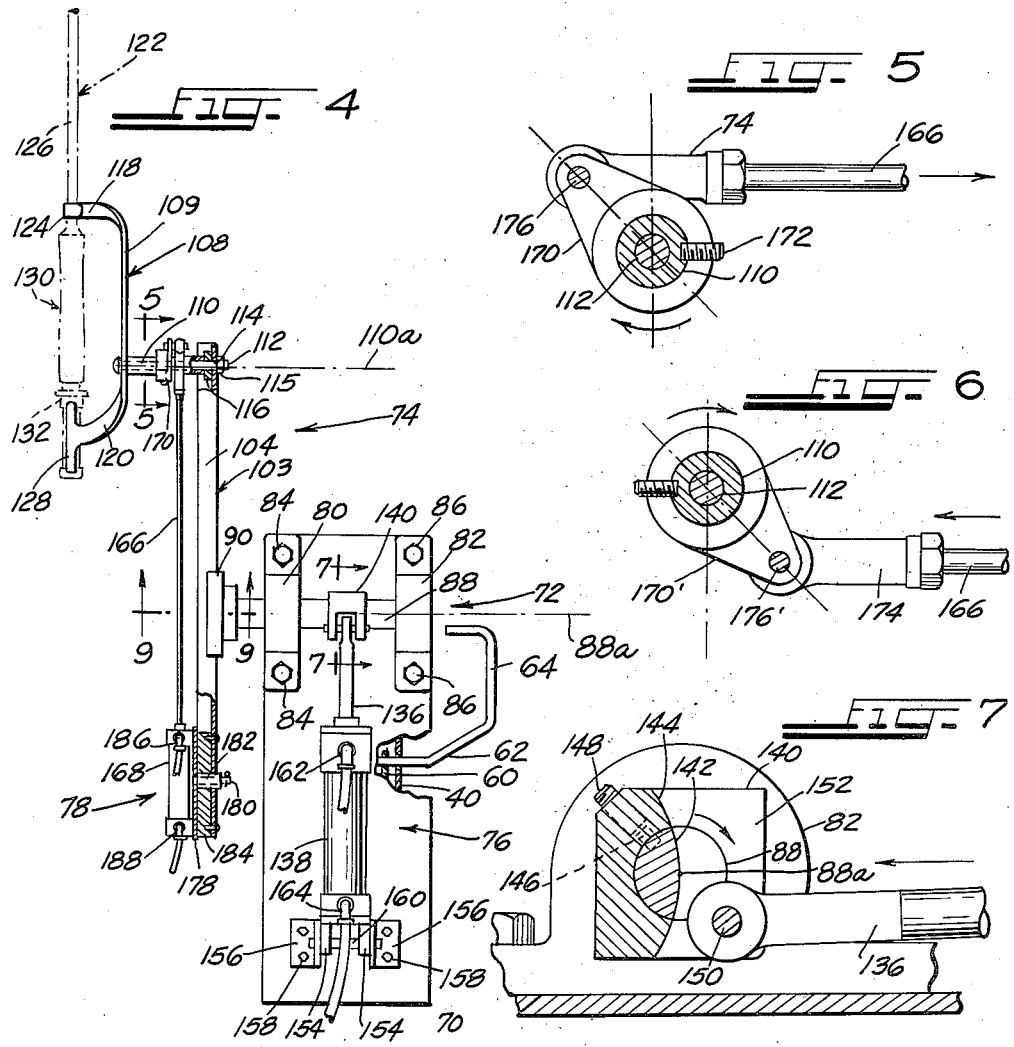
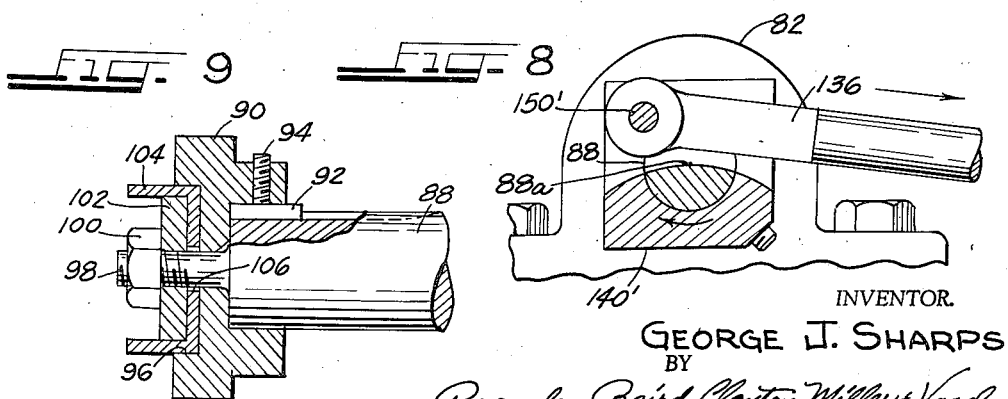
INVENTOR.
GEORGE J. SHARPS
BY
Prangley, Baird, Clayton, Miller & Vogel
ATT'YS.

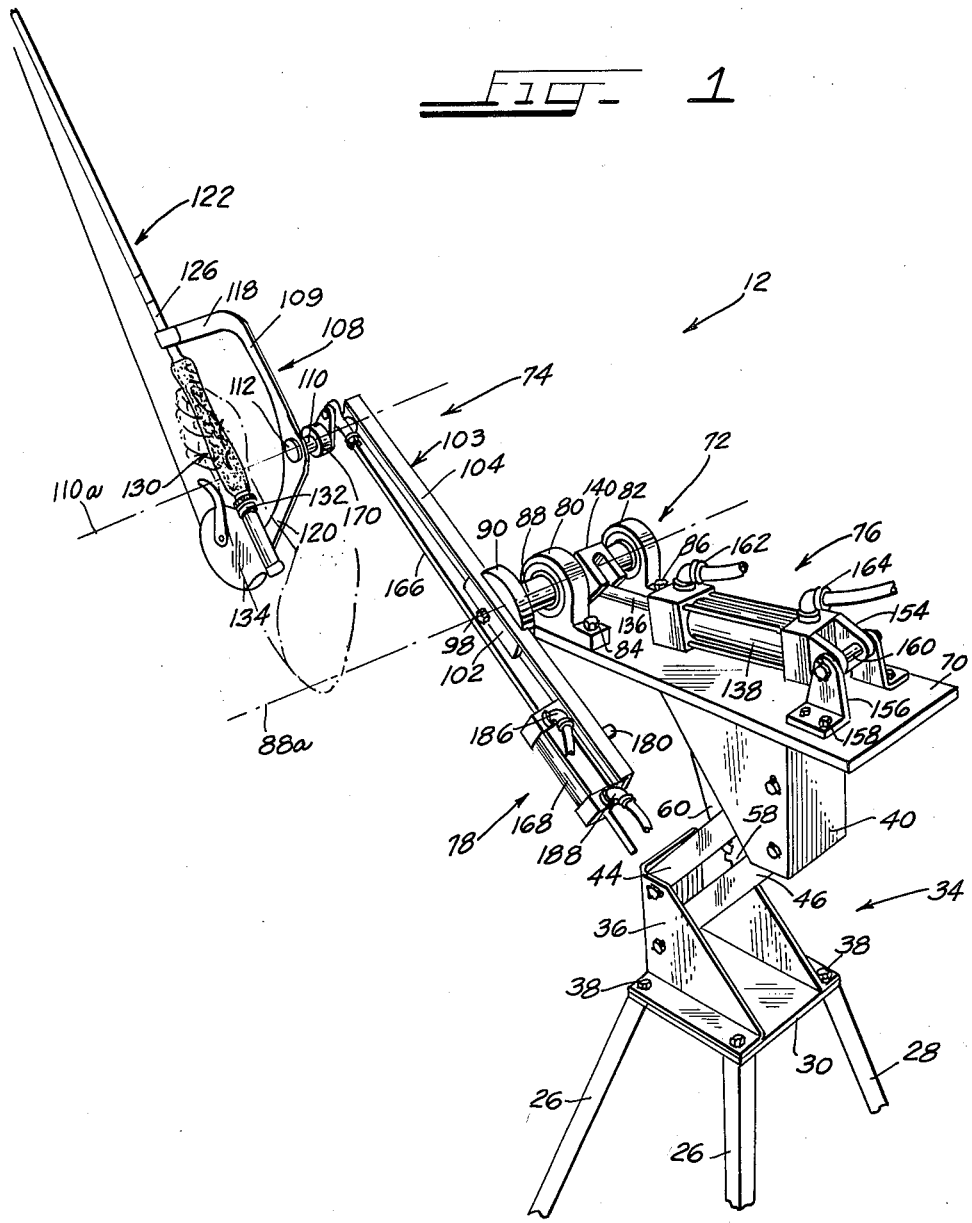

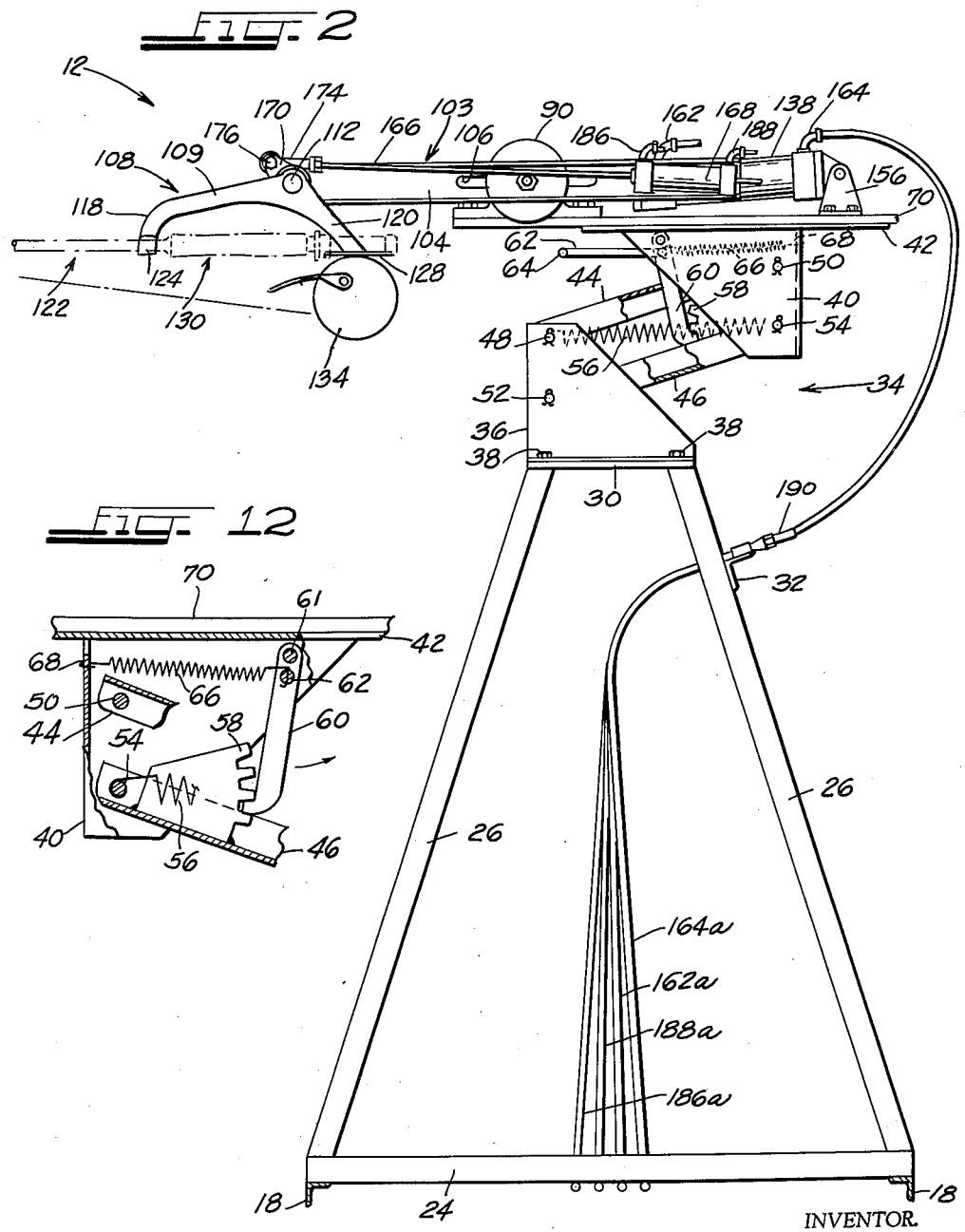

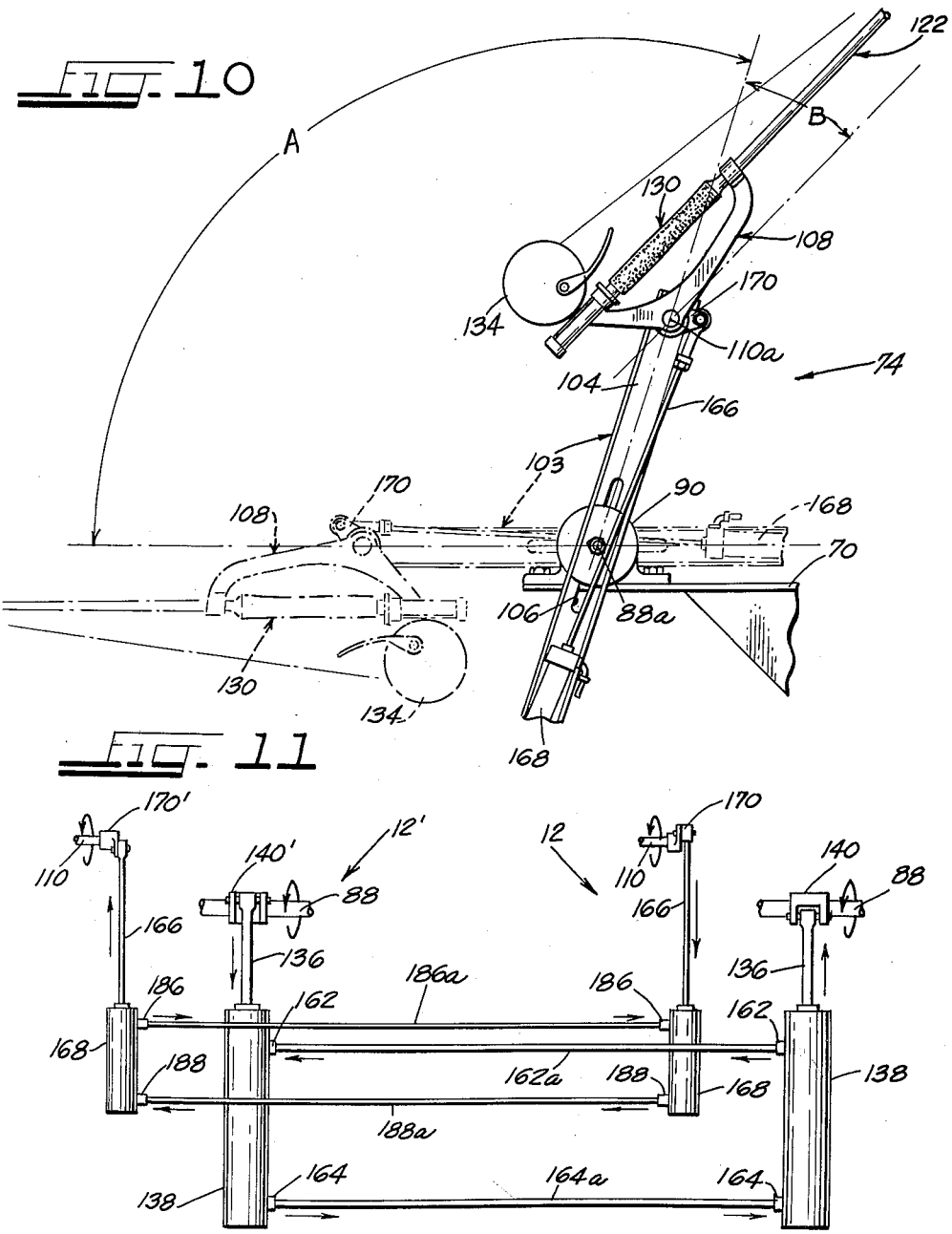

United States Patent Office 3,078,597
Patented Feb. 26, 1963

3,078,597
MACHINE FOR TEACHING THE
ART OF CASTING
George J. Sharps, Momence, Ill., assignor to P & K Incorporated, Momence, Ill., a corporation of Illinois
Filed Feb. 9, 1962, Ser. No. 172,284
12 Claims. (Cl. 35—29)

This invention relates to a machine for teaching the fundamentals of the sport of fishing, more particularly to a machine for teaching the art of casting.

With the ever increasing popularity of the sport of fishing, a growing number of experienced and inexperenced fishermen desire to learn the art of casting. It is also apparent that interest in casting is stimulated by instructional assistance and other aids to learning. Unfortunately, there is an insufficient number of teachers who understand the fundamentals well enough to teach the beginners properly, and considerable time must be spent with each individual. This is especially true as regards fly casting, for which the fishermen must learn the fundamental motions and the proper timing. Ordinarily, from thirty minutes to an hour or more of oral instruction, demonstration, and effort on the part of the pupil is required for the initial lesson. This type of instruction suffers from the limitation that the pupil cannot be made to cast with the correct motions and timing, but can only be shown and told what he is doing wrong. Consequently, there is a great need for instructional aids for teaching the sport of fly casting.

An important object of the present invention is to provide a machine for teaching the art of casting, especially fly casting, which rapidly and correctly imparts the fundamental motions and timing to the pupil.

A particular object is to provide a machine which enables the pupil to learn by duplicating the motions and timing of the instructor, and particularly, which compels the pupil to duplicate the actions of the instructor.

A more particular object is to provide a machine which compels the pupil to follow the arm and wrist movements of the instructor during casting, so that after a very short period of instruction, the motions and timing are ingrained in the pupil, and thereafter, he maintains the same coordination when casting alone.

Another object is to provide a machine for teaching the art of casting which includes a pair of casting control assemblies for the instructor and the pupil, which are coupled with each other for operating synchronously, to transmit the casting motions of the instructor to the pupil and cause the pupil to duplicate them.

An additional object is to provide a machine which is adaptable to the bodies of the individual users, so that anyone may use the machine as an instructor or as a pupil.

A further object is to provide a machine which embodies a relatively simple mechanical structure and occupies little space while performing the desired functions, and which thereby lends itself to individual and group instruction in any convenient location.

These and other objects, advantages, and functions of the invention will be apparent on reference to the specification and to the attached drawings illustrating a preferred embodiment of the invention, in which like parts are identified by like reference symbols in each of the views, and in which:

FIGURE 1 is a perspective view with parts broken away of one of two substantially duplicate casting control assemblies provided in the new casting machine;

FIG. 2 is a side elevational view thereof, with parts broken away;

FIG. 3 is a rear elevational view of the machine, with parts broken away, illustrating the two casting control assemblies coupled with each other;

FIG. 4 is a top plan view with parts broken away, illustrating the guide sub-assembly employed in the casting control assembly of FIG. 1;

FIG. 5 is an enlarged sectional view taken on line 5—5 of FIG. 4, illustrating the connections of a hand power transmission unit in the casting control assembly, in one position thereof;

FIG. 6 is a view like FIG. 5 illustrating the corresponding position of the connections of the hand power transmission unit in the remaining casting control assembly;

FIG. 7 is an enlarged sectional view taken on line 7—7 of FIG. 4, illustrating one position of the connections of an arm power transmission unit in the casting control assembly;

FIG. 8 is a view like FIG. 7 illustrating the corresponding position of the connections of the arm power transmission unit in the remaining casting control assembly;

FIG. 9 is an enlarged sectional view taken on line 9—9 of FIG. 4, illustrating the mounting of an arm guide unit on a guide supporting unit in the casting control assembly;

FIG. 10 is a fragmentary side elevational view like FIG. 2, illustrating the movement of the arm guide unit in the casting control assembly;

FIG. 11 is a schematic view illustrating the connections of the arm power transmission units and of the hand power transmission units in the two casting control assemblies; and FIG. 12 is an enlarged fragmentary vertical sectional view illustrating the manner of mounting and securing a movable support in each assembly, as viewed in the direction opposite to the view of FIG. 2.

In a preferred embodiment of the invention, a machine for teaching the art of casting is provided which includes a pair of casting control assemblies coupled with each other for operating synchronously. Each assembly includes a stand and an arm guide unit mounted on the stand. The guide unit includes a mechanical arm unit pivotally mounted on the stand, and a mechanical hand unit pivotally mounted on the arm unit. The hand unit is adapted for mounting a fishing rod thereon. The handle of the fishing rod is grasped by the user for pivoting his hand together with pivotal movement of the hand unit, and for pivoting his forearm together with pivotal movement of the arm unit. An instructor manipulates the rod and thereby operates one casting control assembly. The second casting control assembly, coupled with the first assembly for operating synchronously, moves the hand and the forearm of the pupil synchronously with the hand and forearm of the instructor.

Very advantageously, the machine includes means for adjusting the height of the arm guide unit according to the height of the user. It also includes means for adjusting the distance between the pivotal axis of the mechanical arm unit and the pivotal axis of the mechanical hand unit, so that the distance corresponds to the length of the forearm of the user.

Referring to the drawings, the new casting machine includes a pair of casting control assemblies 12 and 12' as illustrated in FIG. 3. Since the assemblies are substantially duplicates of each other, the right-hand assembly 12 of FIG. 3 is selected for illustration in the assembled views of FIGS. 1, 2, 4, and 10.

Referring to FIG. 3, the casting machine includes a horizontal platform 14 between the control assemblies, and it may also include a platform 16 on the user's side, or left side, of the left-hand assembly 12'. The platform 14 between the assemblies is mounted on a frame composed of a pair of angle crossbars 18, as also seen in FIG. 2. The second platform 16 is similarly mounted on a frame 20. The frames normally rest on the ground or on a building floor.

Each of the control assemblies 12 and 12' includes a stand 22 having a horizontal rectangular base frame 24 secured to the crossbars 18. Four angle bar legs extend upwardly and are inclined inwardly from the corners of each base frame 24, to which they are secured. One pair of legs 26 on the left side of each stand is disposed in vertical planes, to allow the user to stand close to the assembly. A second pair of legs 28 on the right side of each stand is disposed in oblique planes to provide rigidity. A horizontal plate 30 constitutes the top of each stand, and it is secured to the upper ends of the legs. A horizontal mounting angle bar 32 extends between the rear legs 26 and 28 of each stand, and is secured to the legs adjacent their upper ends.

Referring to FIGS. 1–3 and 12, a carriage or lift 34 is mounted on the top 30 of the stand and is vertically extendable thereon. The carriage includes a base 36 in the form of a channel, which is secured to the top 30 by suitable means such as bolts 38. The carriage 34 also includes a movable support 40 in the form of a channel facing the channel of the carriage base 36. The support 40 includes a horizontal mounting plate 42 secured to the top thereof.

The support 40 is vertically shiftable on the carriage base 36, in a manner which maintains the mounting plate 42 horizontal. Thus, a pair of parallel struts 44 and 46 pivotally interconnect the carriage base and the support. The struts are in the form of channel bars having their channels facing each other. The sides of the channels are pivotally mounted at their opposite ends by pivot rods 48 and 50 for the upper strut, and 52 and 54 for the lower strut, which extend through the opposite sides of the carriage base and the support. The pivot rods 48 and 52 on the base and the pivot rods 50 and 54 on the support lie in respective vertical planes. As the support 40 is raised or lowered with respect to the base 36, the plane of the rods 50 and 54 on the support remains vertical, so that the mounting plate 42 remains horizontal.

Elevation of the support 40 is facilitated by a coil spring 56 which tends to bias the support in the upward direction of movement. The spring is connected in tension diagonally between the struts 44 and 46, to the upper pivot rod 48 on the base 36 and to the lower pivot rod 54 on the support. The spring is extended by moving the support downwardly, and retracts in the upward direction of movement.

The support 40 is secured or locked at a desired elevation by a ratchet and pawl assembly composed of a pair of arcuate ratchets 58 and a pair of pawls 60. The ratchets are secured by suitable means, such as welding, to the flanges on the opposite sides of the lower strut 46. As seen in FIGS. 2–4 and 12, the pawls are fixed on and depend from a pivot rod 61, which is pivotally mounted in the opposite sides of the support 40. A pawl operating rod 62 is joined to the pawls a short distance below the pivot rod 61, and it extends laterally from the support and is bent to form a protruding handle or lever arm 64. A coil spring 66 is connected within the support under tension to the pawl operating rod 62 and to a nib 68 on the rear wall of the support, for urging the pawls into engagement with the ratchets. The pawls are disengaged from the ratchets by pulling up on the handle 64, at which time the support may be raised or lowered. The pawls are reengaged by releasing the handle.

Referring to FIGS. 1–4, a base plate 70 for the guide sub-assembly is secured to the top plate 42 of the carriage. The guide assembly also includes a guide supporting unit 72, an arm guide unit 74, an arm power transmission unit 76, and a hand power transmission unit 78.

The guide supporting unit 72 includes two spaced parallel bearings 80 and 82 secured to the base plate 70 by suitable means such as respective bolts 84 and 86. A shaft 88 is journaled in the bearings for rotation about the shaft axis 88a, and the shaft extends laterally outwardly of the base plate. A coupler 90 is mounted on one end of the shaft for rotation therewith, by means of a key 92 (FIG. 9) in suitable keyways in the shaft and coupler, and a set screw 94 engaging the coupler and bearing on the key. The coupler includes a rectangular groove 96 on its outer surface, extending transversely of the shaft 88. A clamping bolt 98 is secured to the shaft 88, and a clamping nut 100 is threaded thereon. A generally rectangular clamp bar 102 is loosely mounted on the clamping bolt 98, the bolt extending through a corresponding hole in the bar.

The arm guide unit 74 includes a mechanical arm unit 103 mounted on the supporting unit 72. The arm unit includes an arm 104 in the form of a channel bar having a central longitudinal adjustment slot 106 (FIGS. 2 and 9) in the base thereof. The arm 104 is mounted in the groove 96 of the coupler 90, with the clamping bolt 98 extending through the slot 106. The clamp bar 102 is received on the outer side of the base of the arm 104, and the clamping nut 100 is tightened thereagainst for securing the arm 104 in a desired position. The position of the arm may be adjusted within the limits of the adjustment slot by loosening the clamping nut and sliding the arm in the groove 96. In this manner, the arm unit 103 is secured to the supporting unit shaft 88 transversely thereof for rotation therewith about the shaft axis 88a, and the position of the arm unit may be adjusted transversely of the shaft.

The arm guide unit 74 also includes a mechanical hand unit 108 pivotally mounted at the front end of the guide unit. The hand unit includes a crossbar 109 mounted intermediate its ends on a tubular shaft 110 fixed thereto and rotatable about its axis 110a on a threaded bolt 112. The bolt extends through the crossbar, the shaft, a supporting bar 116 mounted in the channel of the arm 104, and an opening 114 in the arm. The bolt is secured on the arm by a nut 115 on the side opposite to the shaft. The hand unit 108 includes front and rear downwardly and outwardly projecting fingers 118 and 120, respectively, integral with the ends of the crossbar 109. The fingers hold and support a casting rod 122. The front finger 118 terminates in a loop or clip 124 which receives and holds the shaft 126 of the rod. The rear finger 120 terminates in a mounting flange 128 which is secured on the handle 130 of the rod by a locking ring 132, in the same manner as a reel normally is secured to the rod. As seen in FIGS. 1–3, a reel 134 is fixed to the underside of the mounting flange 128 as part of the assembly, for use with any rod 122 which is mounted on the hand unit 108. The hand unit 108 and attached reel 134, and the rod 122 thus are rotatably mounted on the arm unit 103 for rotation about the axis 110a of the guide unit shaft 110, which axis is parallel to the axis of rotation 88a of the arm unit.

The manner in which the control assembly 12 is used is illustrated in FIG. 1 by a representation of the user's right arm in phantom lines. The handle 130 of the fishing rod 122 is grasped by the user so that the axis of rotation 110a of the guide unit shaft 110 intersects the user's wrist or substantially so. When the hand is pivoted at the wrist, the mechanical hand unit 108 pivots or rotates together with the hand about the axis 110a. Likewise, when the mechanical hand unit is caused to pivot by other means, as subsequently described, the hand of the user on the handle 130 is caused to pivot therewith.

The user's forearm extends substantially along the mechanical arm unit 103, and his elbow is intersected by the axis 88a of the supporting unit shaft 88, about which axis the arm unit rotates, or substantially so. Two adjustments of the control assembly 12 are made for this purpose. The arm 104 is adjusted in the coupler groove 96, to adjust the distance between the axis 110a of the guide unit shaft 110 and the axis 88a of the supporting unit shaft 88, until the distance equals the length of the user's forearm. The elevation of the movable support 40 on the carriage 34 is adjusted so that the axis 88a of the supporting unit shaft 88 lies at the same elevation as the user's elbow. With the assembly adjusted, when the user grasps the rod handle 130, pivotal movement of the user's forearm at the elbow causes the mechanical arm unit 103 to pivot together therewith about the axis 88a intersecting the user's elbow or substantially so. Likewise, as also subsequently described, when the arm unit is caused to pivot by other means, the user's arm is caused to pivot together with the arm unit when the rod handle is grasped.

FIGURE 10 illustrates the angular working area of the arm guide unit 74. The user's forearm and the mechanical arm unit 103 may be pivoted about the axis 88a from the horizontal position shown in phantom lines through an angle A of about 108 degrees in the backward movement of the arm in casting. The user's hand and the handle 130 of the rod 122 may be pivoted backwardly an additional angular distance B about the axis 110a in cocking the wrist. The working area is well suited to instructional fly casting with the fly rod 122. It will be apparent that the machine may also be used for instruction in bait casting, e.g. spin casting, with a suitable rod and reel mounted on the hand unit 108.

Referring now especially to FIGS. 1, 4 and 7, the arm power transmission unit 76 includes double-acting hydraulic piston and cylinder means constructed of a piston rod 136 joined to a piston (not shown) which reciprocates in an hydraulic chamber 138. The outer end of the piston rod is pivotally connected to a yoke 140 mounted on the supporting unit shaft 88. The shaft is provided with a groove 142 having a concave base centrally of the yoke, which is similarly grooved as indicated at 144. The yoke is secured in fixed position on the shaft by means of a key 146 and a set screw 148 in the yoke and bearing on the key. The piston rod 136 is pivotally mounted on a pin 150 bridging the sides 152 which border the groove 144 of the yoke. FIG. 8 illustrates the connections of the unit on the companion control assembly 12'. A similar pin 150' is mounted on the opposite side of the groove in a similar yoke 140', and the yoke is turned 90 degrees on the supporting unit shaft 88, so that the pin 150' is displaced 180 degrees about the axis 88a of the shaft from the pin 150 illustrated in FIG. 7. The modifications of FIG. 8 are for the purpose of more conveniently making the connections between the control assemblies 12 and 12', as subsequently described.

The cylinder 138 is provided with a pair of rearwardly extending perforated ears 154, the openings of which are in register with openings in upstanding flanges of a pair of mounting brackets 156 secured to the base plate 70 by suitable means such as bolts 158. The cylinder is pivotally mounted on the brackets by a mounting pin 160 which extends through the openings in the brackets and the ears. The pivotal mounting of the cylinder accommodates the up and down movement of the piston rod as it travels eccentrically about the axis 88a of the supporting unit shaft 88. The cylinder 138 also includes hydraulic fittings 162 and 164 at the opposite ends thereof.

The hand power transmission unit 78 includes second double-acting hydraulic piston and cylinder means, constructed of a piston rod 166 joined to a piston (not shown) which reciprocates in a cylinder 168. Referring especially to FIGS. 1, 4, and 5, the outer end of the piston rod is pivotally connected to a crank 170 fixed on the guide unit shaft 110 by means of a set screw 172. A connector 174 is pivotally mounted on a pivot bolt 176 on the crank, and the outer end of the piston rod 166 is joined to the connector. As seen in FIG. 6, the corresponding piston rod 166 in the companion control assembly 12' is connected in a similar manner to the guide unit shaft 110. In this assembly, however, the crank 170' and the pivot bolt 176' are arranged at an angle of 180 degrees with respect to the corresponding parts in the first assembly 12. The connections are made in this manner to facilitate coupling the assemblies 12 and 12', as subsequently described.

Referring especially to FIG. 4, the cylinder 168 is secured to a mounting plate 178, which is in turn secured to a pivot pin 180. A tubular sleeve 182 surrounds the pivot pin. A spacer and support bar 184 is secured on the arm 104 at this location. The sleeve 182 and the pivot pin 180 extend through an opening in the arm to pivotally mount the cylinder 168 thereon. The cylinder turns on the pivot as the position of the piston rod 166 changes with rotation of the guide unit shaft 110. Hydraulic fittings 186 and 188 are mounted at the opposite ends of the cylinder.

The arm and hand power transmission units 76 and 78 of the two control assemblies 12 and 12' are interconnected hydraulically. The connections are illustrated in FIGS. 2 and 3, and are represented schematically in FIG. 11. The fittings 162 and 164 on the cylinders 138 in the arm power transmission units 76 of the two control assemblies are interconnected by respective hydraulic conduits 162a and 164a. The fittings 186 and 188 on the cylinders 168 of the hand power transmission units 78 in the assemblies are interconnected by respective hydraulic conduits 186a and 188a. The several conduits are constructed of flexible tube sections joined by couplings 190, and the couplings are mounted on the mounting bars 32 on the stands 22. The sections of the flexible conduits 162a and 164a joined to the fittings 162 and 164 accommodate the raising and lowering of the support 40 of the carriage 34 of each control assembly. The sections of the flexible conduits 186a and 188a joined to the fittings 186 and 188 accommodate the movement of the support 40, and also the pivotal movement of the arm unit 103 of each control assembly. The lower sections of the several conduits extend between the control assemblies 12 and 12' and beneath the platform 14.

Like fittings on the corresponding hydraulic cylinders in the assemblies 12 and 12' are connected directly to each other, as represented in FIG. 11, to facilitate correct coupling of the assemblies. For the arm units 103 and the hand units 108 of the assemblies to pivot together in the same direction, it is then necessary that the connections with the yokes 140 and 140' on the respective shafts 88 be made at 180 degrees to each other, and the connections with the cranks 170 and 170' on the respective guide unit shafts 110 be at 180 degrees to each other, as described above. FIGURE 11 illustrates by means of arrows how the supporting unit shafts 88 rotate in the same direction while the first piston rods 136 move in opposite directions, and the guide unit shafts 110 rotate in the same direction while the second piston rods 166 move in opposite directions. Alternatively, if desired, the hydraulic connections between corresponding cylinders may be made between opposite ends thereof, so that the piston rods 136, 136 and 166, 166 move together in the same directions. In such case, the yoke 140' is replaced by the yoke 140 and connected in the same manner to the piston rod 136, i.e., as shown in FIG. 7. The crank 170' is mounted and connected to the piston rod 166 in the same manner as for the crank 170, as shown in FIG. 5.

In using the casting machine, an instructor and a pupil take standing positions on the left sides of the respective control assemblies 12' and 12, with their right hands and forearms in the positions illustrated in FIG. 1. The instructor preferably operates the left-hand assembly 12' with the pupil on his right hand, but their positions may be reversed if desired. The pupil merely grasps the rod handle 130 and permits the movements of his hand and forearm to be controlled by the machine. The instructor operates the machine by handling the rod 122 in the correct manner for casting.

As an example of the operation, the instructor may bring the rod back from the phantom position to the full line position illustrated in FIG. 10. The accompanying movements of the components of the power transmission units are illustrated in FIG. 11. As the instructor raises the rod by the handle 130, the arm unit 103 pivots on the axis 88a of the supporting unit shaft 88 in the clockwise direction as viewed in FIG. 10. The connection to the yoke 140' illustrated in FIG. 8 causes the piston rod 136 to move in the direction of the cylinder 138 and force hydraulic fluid from the rear fitting 164 through the conduit 164a to the rear fitting 164 of the cylinder 138 on the control assembly 12 used by the pupil. The piston rod 136 thereof moves away from the cylinder, and by virtue of its connection to the yoke 140 as illustrated in FIG. 7, the supporting unit shaft 88 is caused to move synchronously with the shaft 88 turned by the instructor. The shaft 88 on the assembly 12 causes the arm unit 103 thereof to move in the same direction and with the same timing as the arm unit 103 on the assembly 12' operated by the instructor. The forearm of the pupil moves with the arm unit 103 and is thus caused to function properly.

As the instructor operating the assembly 12' cocks or bends his wrist, the hand unit 108 of the assembly pivots in the clockwise direction and turns the guide unit shaft 110. The connection with the crank 170' causes the attached piston rod 166 to move away from the cylinder 168. Hydraulic fluid is forced from the forward fitting 186 on the cylinder through the conduit 186a and into the forward fitting 186 on the cylinder 168 of the assembly 12 employed by the pupil. The piston rod 166 thereof moves in the direction of the cylinder 168, and the connection with the crank 170 illustrated in FIG. 5 causes the guide unit shaft 110 to turn in the same direction as that on the instructor's control assembly. The hand unit 108 on the pupil's control assembly is caused to turn and thus causes the pupil's wrist to pivot synchronously with the instructor's hand. When the instructor brings the rod 122 forward, moving it in the counterclockwise direction as viewed in FIG. 10, the directions of movement imparted to the control assembly 12' are reversed. The components of the remaining assembly 12 move synchronously in the reverse directions, to synchronize the hand and forearm movements of the pupils with those of the instructor.

In this manner, the pupil is caused to duplicate exactly the correct motions and timing. Only a relatively small number of repetitions is necessary to teach the pupil the proper motions and instill in him the correct timing. After a very short period of physical operation accompanied by oral instruction, the pupil is able to cast properly without assistance. The invention solves the major problem of having to rely on merely lecturing or demonstrating the movements in teaching casting operations which require dexterity. The invention stimulates interest in learning to cast, and makes it possible to teach many individuals with few instructors. It is a valuable aid to the operation of sporting goods establishments and promotes the sale of equipment while giving valuable impetus to the sport of fishing.

It will be apparent that various changes and modifications may be made in the new machine and in the construction and arrangements of its parts within the spirit and scope of the invention. It is intended that such changes and modifications be included within the scope of the appended claims.

I claim:

1. A machine for teaching the art of casting, which comprises a pair of casting control assemblies coupled with each other for operating synchronously, each said assembly comprising a stand and an arm guide unit mounted thereon, said guide unit including a mechanical arm unit pivotally mounted on said stand, and a mechanical hand unit pivotally mounted on said arm unit, said hand unit being adapted for mounting a fishing rod thereon, whereby the handle of said rod may be grasped by the user for pivoting his hand together with pivotal movement of said hand unit, and for pivoting his forearm together with pivotal movement of said arm unit.

2. A machine as defined in claim 1 including lift means supporting said arm guide unit on said stand, for adjusting the height of said guide unit.

3. A machine as defined in claim 1 including means for adjusting the distance between the pivotal axis of said arm unit and said hand unit.

4. A machine as defined in claim 3 including adjustable means pivotally mounting said arm unit on said stand, for adjusting the location on said arm unit of the pivotal axis thereof.

5. A machine as defined in claim 1 including first hydraulic power transmissions means connecting the arm units of said assemblies together for operating the arm units synchronously, and second hydraulic power transmission means connecting the hand units of said assemblies together for operating the hand units synchronously.

6. A machine for teaching the art of casting, which comprises a pair of casting control assemblies, each said assembly comprising a stand, a guide supporting unit mounted thereon, an arm guide unit mounted on said supporting unit, an arm power transmission unit mounted on said stand, and a hand power transmission unit mounted on said guide unit, said supporting unit including a shaft rotatably mounted on said stand, said guide unit including a mechanical arm unit secured to said shaft transversely thereof for rotation therewith about the shaft axis, said arm unit being adjustably movable transversely of said shaft, said guide unit also including a shaft rotatably mounted on said arm unit and a mechanical hand unit secured to the latter shaft transversely thereof for rotation therewith about the shaft axis, said hand unit being adapted for mounting a fishing rod thereon, whereby the handle of said rod may be grasped by the user for pivoting his hand together with rotation of said hand unit, and for pivoting his forearm together with rotation of said arm unit, said arm power transmission unit including first hydraulic piston and cylinder means connected to said supporting unit shaft, said hand power transmission unit including second hydraulic piston and cylinder means connected to said guide unit shaft; first hydraulic conduit means interconnecting said first piston and cylinder means of said control assemblies, for rotating said arm units thereof synchronously and thereby pivoting the forearms of the users synchronously; and second hydraulic conduits means interconnecting said second piston and cylinder means of said control assemblies, for rotating said hand units thereof synchronously and thereby pivoting the hands of the users synchronously.

7. A machine as defined in claim 6 including lift means supporting said guide supporting unit and said arm power transmission unit on said stand, for adjusting the height of said arm guide unit.

8. A casting control assembly adapted for use in multiple to teach the art of casting, which comprises a stand; an arm guide unit mounted thereon, said guide unit including a mechanical arm unit pivotally mounted on said stand, and a mechanical hand unit pivotally mounted on said arm unit, said hand unit being adapted for mounting a fishing rod thereon, whereby the handle of said rod may be grasped by the user for pivoting his hand together with pivotal movement of said hand unit, and for pivoting his forearm together with pivotal movement of said arm unit; means for coupling said arm unit with the arm unit of another control assembly for operating the arm units synchronously; and means for coupling said hand unit with the hand unit of another control assembly for operating the hand units synchronously.

9. A casting control assembly as defined in claim 8 wherein said means for coupling said arm unit comprises first hydraulic piston and cylinder means connected thereto, and said means for coupling said hand unit comprises second hydraulic piston and cylinder means connected thereto.

10. A guide assembly adapted for mounting in multiple to teach the art of casting, which comprises a guide supporting unit; an arm guide unit mounted thereon, said guide unit including a mechanical arm unit pivotally mounted on said supporting unit, and a mechanical hand unit pivotally mounted on said arm unit, said hand unit being adapted for mounting a fishing rod thereon, whereby the handle of said rod may be grasped by the user for pivoting his hand together with pivotal movement of said hand unit, and for pivoting his forearm together with pivotal movement of said arm unit; means for coupling said arm unit with the arm unit of another guide assembly for operating the arm units synchronously; and means for coupling said hand unit with the hand unit of another guide assembly for operating the hand units synchronously.

11. A guide assembly as defined in claim 10 including means for adjusting the distance between the pivotal axes of said arm unit and said hand unit.

12. A guide assembly as defined in claim 10 wherein said means for coupling said arm unit comprises first hydraulic piston and cylinder means connected thereto, and said means for coupling said hand unit comprises second hydraulic piston and cylinder means connected thereto.

No references cited.